Oct. 3, 1967  A. TSCHURSCH ETAL  3,345,106

VEHICLE SEAT

Filed March 7, 1966

Inventor:
ARNOLD TSCHURSCH
ANTON STUCKENBERGER
BY
Thomas D. Graham
ATTORNEY

United States Patent Office 3,345,106
Patented Oct. 3, 1967

3,345,106
VEHICLE SEAT
Arnold Tschursch, Vagen, and Anton Stuckenberger, Hinrichsegen, Germany, assignors to Georg Fritzmeier KG, Grosshelfendorf uber Munich, Germany
Filed Mar. 7, 1966, Ser. No. 532,236
Claims priority, application Germany, Mar. 12, 1965, F 45,509
4 Claims. (Cl. 297—308)

The invention relates to a vehicle seat.

The object of the invention is to provide a seat suspension that affords on the one hand the comfort of a straight-line resiliently supported seat sliding movement, and on the other needs a ground clearance relative to the vehicle that is hardly greater than the maximum extent of seat resilience to be expected.

To solve this problem we provide for the vehicle seat according to the invention a stationary supporting rod extending horizontally, said rod having ground clearance in a direction at a right angle to the vehicle axis, and a somewhat L-shaped angular frame for the seat, with a back rest portion and a seating portion forming the L, wherein the back rest portion forms a counterguide for a guide provided on the supporting rod, the arrangement being such that in the seating portion, or in the supporting rod under the seating portion, there is provided a torsion bar spring which upon a sliding movement between seating portion and supporting rod is subjected to torsional forces by a lever guided in the respective part i.e., the seating portion or the supporting rod.

Such a vehicle seat does not only perform a completely straight-line movement of resilience and allows for a minimum of ground clearance, but also makes it possible to use an extremely compact structure, wherein housing all parts of the spring suspension in a covering panel of the seat frame involves only a minimum of extra material; this may be done for the purpose of protecting the parts e.g. from exposure.

In order to achieve a maximum of stability there is conveniently provided on each end of the supporting rod an upright arm having spaced guide rollers in superimposed arrangement and facing these rollers there is provided in front of each end of the guide rod a frame guide rail of U-shaped section that receives these rollers.

Preferably the supporting rod is a pipe in which there is arranged an internal pipe, the torsion bar spacing being fixed to the one end of the internal pipe and being on the other end capable of rotation with respect thereto, wherein the torsional moment is supplied to the torsion bar spring via two essentially longitudinal levers, each, being fixed to one pipe end supported by rollers in the seating portion that is likewise formed by U-shaped sections. Designing the supporting rod as a pipe allows for a tilting movement of the seat about the pipe axis by providing a suitable clamping support.

The supporting pipe is suitably provided on a single centrally arranged supporting foot being preferably in the form of a telescopic-type tube for vertical adjustment and all-round rotation, thereby allowing the seat to perform both a lateral tilting movement and a longitudinal tilting movement.

It is of particular advantage if the seat panel covering the frame is provided with a hollow space to receive the supporting rod with arms.

The invention will be described hereinafter with the help of schematic drawings illustrating one embodiment of the invention, wherein FIGURES 1, 2 and 3 show a front elevation, a side elevation and a plan view of a vehicle seat designed according to the invention;

Figures 1, 2:
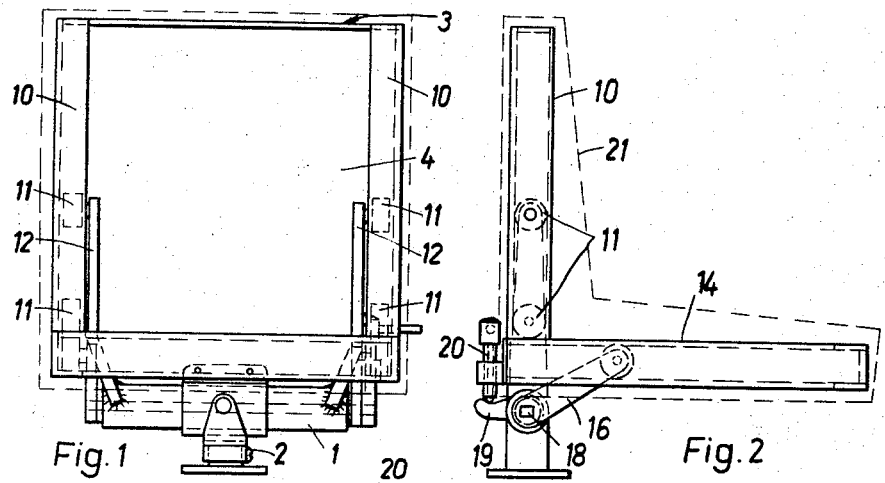
Figures 3, 4:
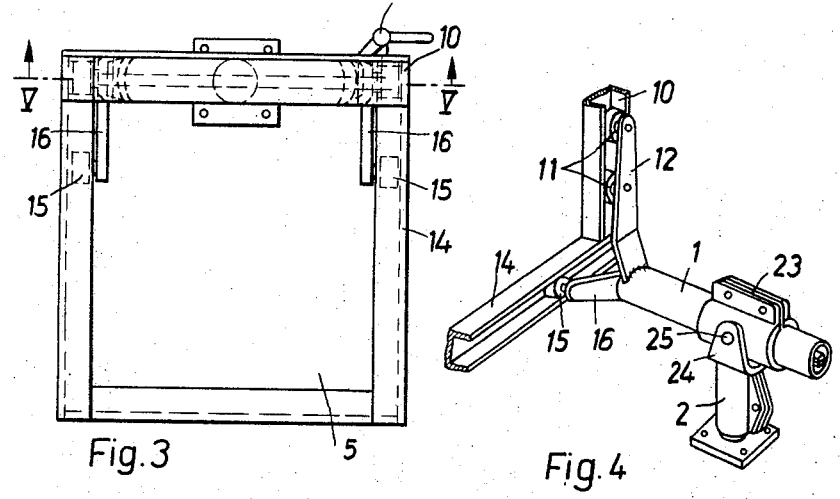
FIGURE 4 shows a perspective part view of a spring suspension of the vehicle seat according to FIGURES 1 and 3.

For the main part, the illustrated vehicle seat consists of a stationary horizontal supporting pipe extending transversely to the vehicle axis and being mounted to the vehicle by means of the telescopic-type foot 2, and of a rigid frame 3 of U-shaped section which has an L-shaped angular configuration and provides for a back rest portion 4 and a seating portion 5.

The two U-shaped sections 10 limiting the back rest portion 4 at the sides are facing with their open sides and guided vertically, respectively, by means of two rollers 11, each, which engage these sections and which are pivotally mounted to arms 12 forming part of the supporting pipe 1 that is rigidly mounted to the chassis of the vehicle.

Figure 5:
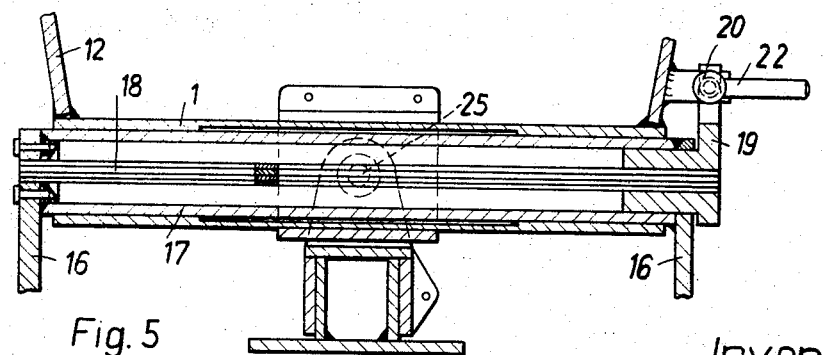
FIGURE 5 shows a sectional view along line V—V of FIGURE 3, the parts being, however, so illustrated as being tilted through a 90° angle.

The two U-shaped sections 14 limiting the seating portion 5 at the sides are likewise facing with their open sides and rigidly connected to the U-shaped section 10 of the back rest portion. The horizontally extending U-shaped sections 14, each, form the guide of a roller 15 seated on the other end of a lever 16 which is fixed to pipe 17 that in turn is rotatably supported interior of the supporting pipe 1. Inside of pipe 17 there is provided a torsion bar spring 18 which is shown in FIGURE 5 with its left end fixed to lever 16 that is tilted through an angle of 90° the plane of the section. The other end of torsion bar spring 18 which is likewise illustrated as being tilted through an angle of 90° the plane of the section of FIGURE 5 is supported via an arm 19, on a screw 20 that is adjustable relative to the supporting pipe 1 in such a manner that depressing of frame 3 results in a torsion of the torsion bar spring and thus a spring suspension of the seating load. Screw 20 may be turned with the help of socket lever 22 in order to adjust the pretension of the torsion bar spring through pivoting the arm about the pipe axis.

In the present case the supporting pipe 1 is enclosed by a clamping collar 23 allowing a rotational movement of the supporting pipe and thus a longitudinal tilting movement of the seat. Clamping collar 23 itself is hingedly supported in a forkhead 24 at 25 for the lateral tilting adjustment of the seat upon travel on slopes. The forkhead is adapted for rotation relative to the supporting foot or together therewith, thereby allowing for a swivel movement of the seat. In order to achieve vertical adjustment of the seat the supporting foot is designed in a telescopic-type manner, such as it is indicated in FIGURE 5.

The U-shaped sectional frame may readily be housed together with the spring suspension in a frame cover panel 21 receiving the seat upholstery, such as it is indicated in FIGURES 1 and 2 by dashes.

In the place of the illustrated embodiment a reverse construction may also be employed. In such a case each sectional guide rail 14 of the seating portion 5 would house a torsion bar spring, while the levers 16 connected therewith would then be roller-guided in or on supporting pipe 1.

What is claimed is:

1. Seat for use in a vehicle, having an approximately L-shaped rigid angular frame consisting of a back portion and a seating portion, a supporting structure relative to which the frame is resilient and guided and which consists of a supporting rod for support on the vehicle horizontally and at right angles to the middle vertical plane of the seat, upright arms which are mounted at the ends of the supporting rod so as to stand up freely, rollers in superimposed arrangement on said upright arms on which the back portion is guided, and a suspension system consisting of a torsion bar spring disposed in the supporting rod, said torsion bar having a swinging lever arrangement at each end, lateral portions on said L-shaped frame forming inwardly open U-shapes, said lateral portions having upright and horizontal portions, said rollers guided with their axes parallel to the back plane in said open U's and, additional rollers on said swinging levers of the torsion bar spring disposed in said open U's on the horizontal portion of said frame, said rigid frame and the lateral portions being covered by a seat cover panel which has space in the area of the back portion for receiving the supporting rod with the arms.

2. Vehicle seat as claimed in claim 1 wherein the supporting rod stands on a single centrally arranged supporting foot.

3. Vehicle seat as claimed in claim 2, wherein the supporting foot is formed by a telescopic-type for vertical adjustment and all-round rotation.

4. Vehicle seat as claimed in claim 3 wherein said supporting foot and supporting pipe are connected by means of a swivel bearing.

References Cited
UNITED STATES PATENTS

| | | | |
|---|---|---|---|
| 1,767,757 | 6/1930 | Harris | 297—307 |
| 1,770,321 | 7/1930 | Mougeofte | 248—376 |
| 1,905,588 | 4/1933 | Harris | 297—308 |
| 2,629,427 | 2/1953 | McIntyre | 248—377 |
| 2,757,712 | 8/1956 | Johnson | 108—136 X |
| 2,760,553 | 8/1956 | Lie | 248—373 |
| 3,025,032 | 3/1962 | Leja | 248—399 |
| 3,131,904 | 5/1964 | Lie | 248—373 |
| 3,139,304 | 6/1964 | Lehner | 297—345 |
| 3,140,851 | 7/1964 | Bilancia | 248—399 |

FRANCIS K. ZUGEL, *Primary Examiner.*